July 2, 1968  E. B. MYERS  3,390,943
SAFETY SHUT-OFF VALVE FOR USE IN A FUEL TRANSMITTING CONDUIT
Filed Nov. 8, 1962  4 Sheets-Sheet 1

INVENTOR.
EDWARD B. MYERS
BY
ATTORNEY.

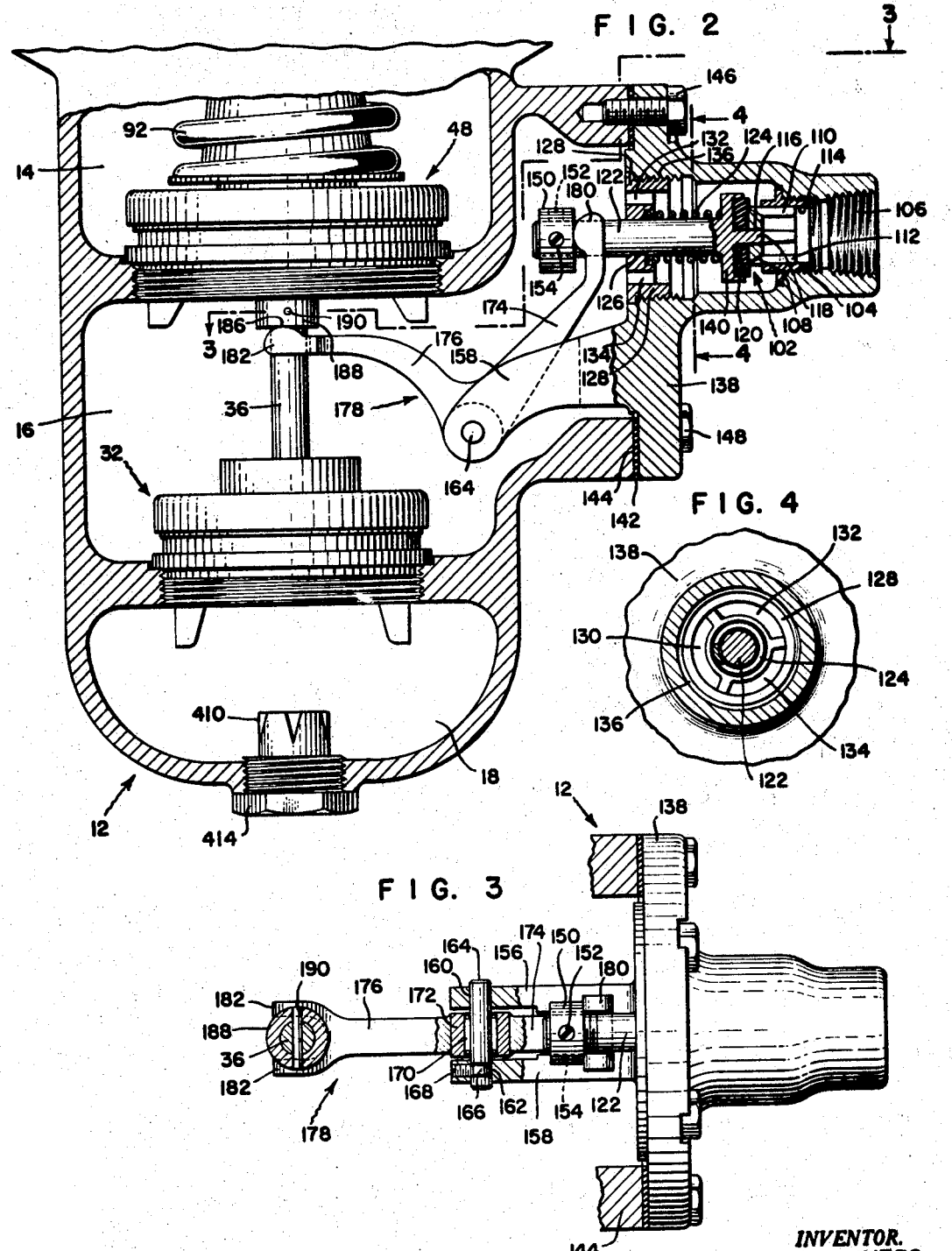

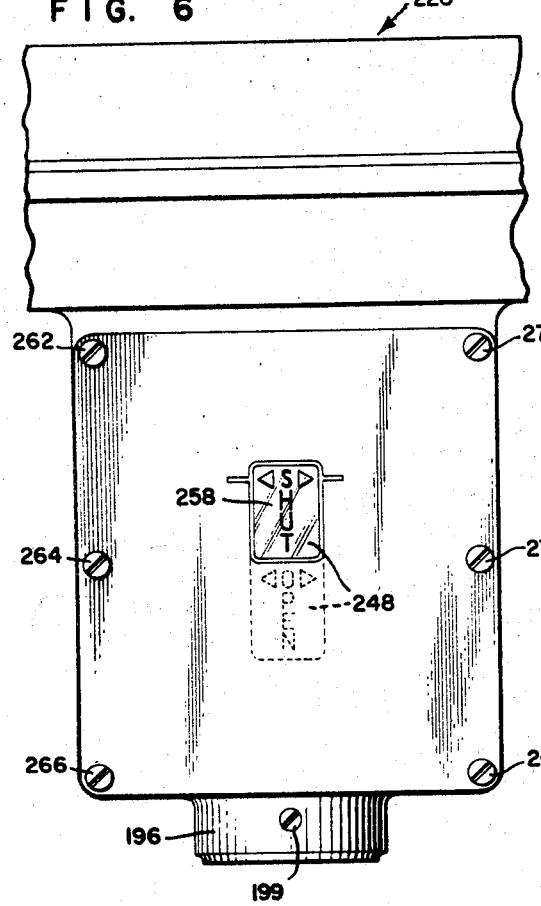
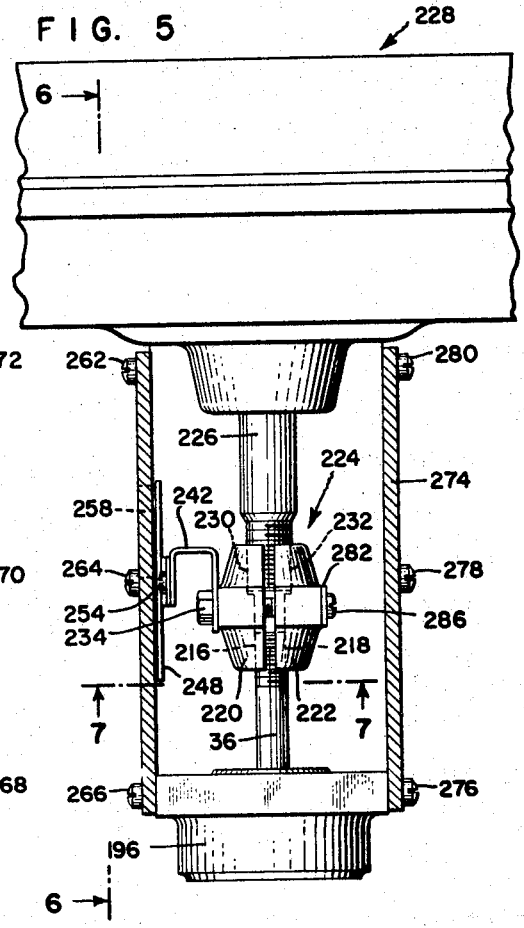
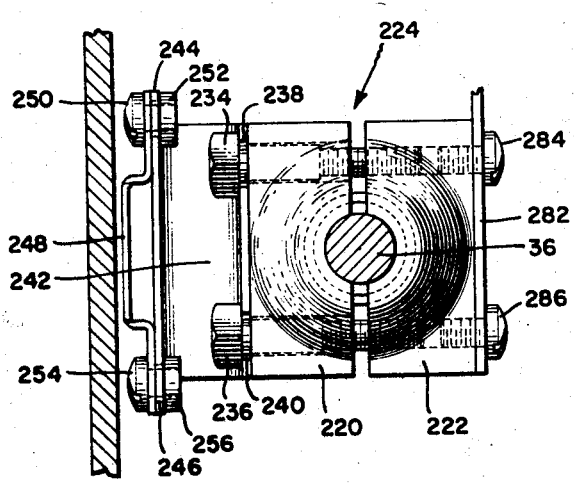

July 2, 1968    E. B. MYERS    3,390,943
SAFETY SHUT-OFF VALVE FOR USE IN A FUEL TRANSMITTING CONDUIT
Filed Nov. 8, 1962    4 Sheets-Sheet 4
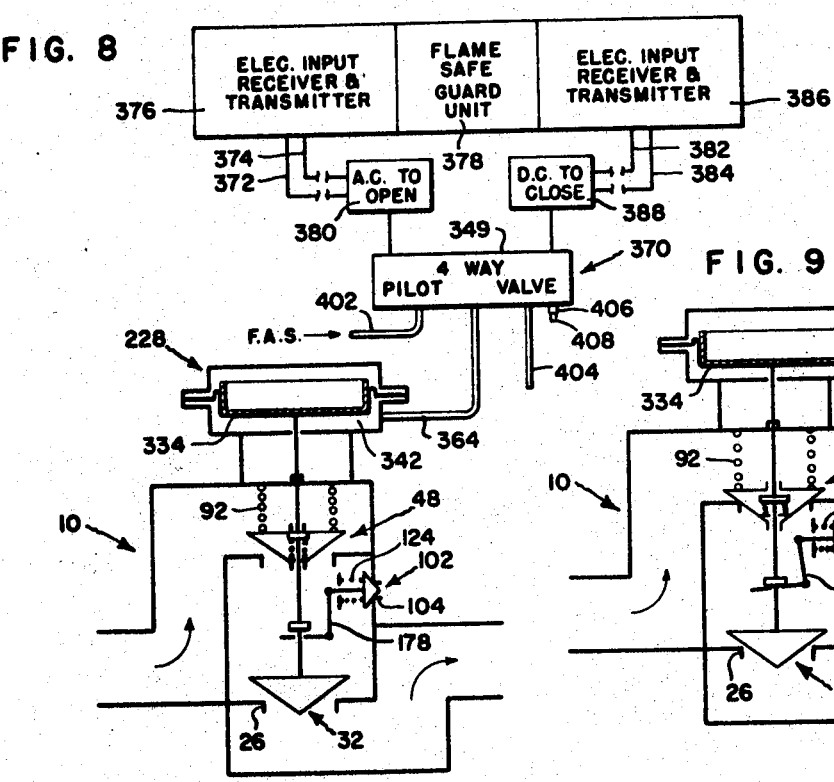
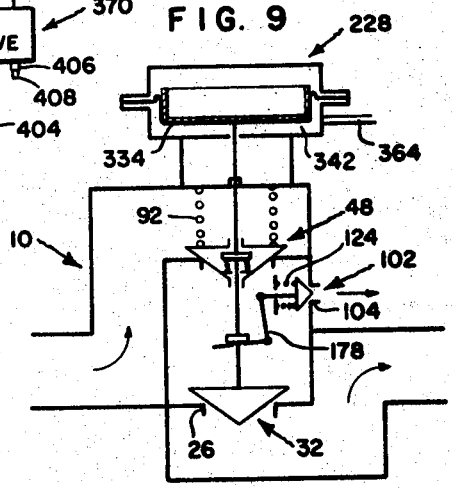
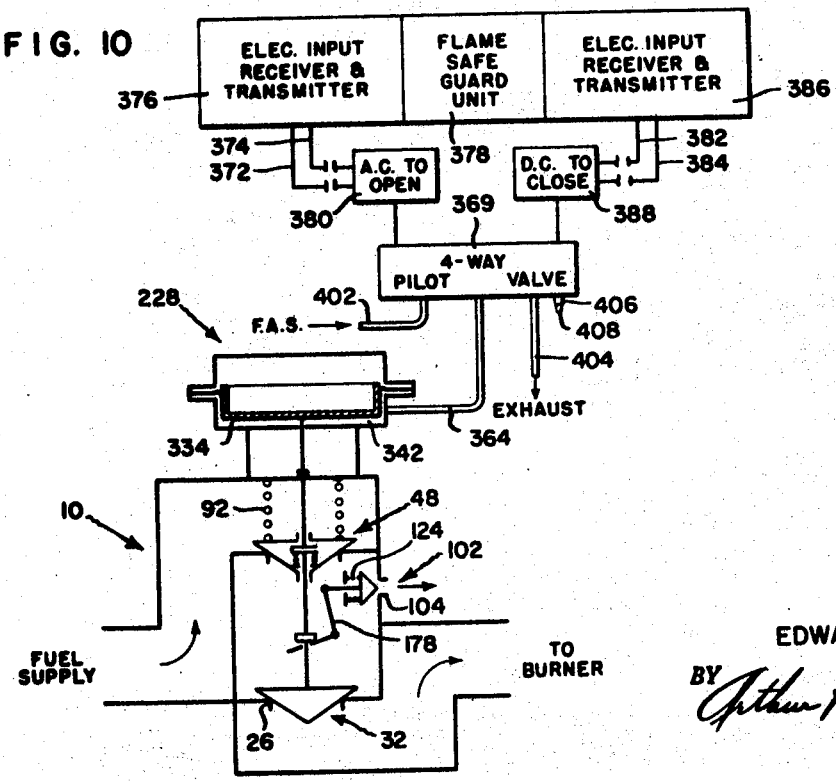
INVENTOR.
EDWARD B. MYERS
BY Arthur H. Sirenson
ATTORNEY.

United States Patent Office 3,390,943
Patented July 2, 1968

3,390,943
SAFETY SHUT-OFF VALVE FOR USE IN A FUEL
TRANSMITTING CONDUIT
Edward B. Myers, Oreland, Pa., assignor to Honeywell
Inc., a corporation of Delaware
Filed Nov. 8, 1962, Ser. No. 236,332
3 Claims. (Cl. 431—78)

The general object of the present invention is to disclose a unique safety shut-off valve for use in a fuel transmitting conduit.

It is another object of the present invention to disclose a safety valve of the aforementioned type that is of a single body construction which provides a pair of spaced-apart seats against which associated plugs can be seated, and which construction further provides a seat for a plug of a vent valve that is operably connected for movement with the first-mentioned plugs between an open vent and closed vent position.

A more specific object of the present invention is to provide the main transmitting gas line to a burner of a gas fired boiler with a valve of the aforementioned single body construction in lieu of making use of a conventional, individually actuated vent valve and conduit between two spaced-apart, single seat safety shut-off valves in a main gas line as has heretofore been the standard practice in gas transmitting line applications.

Another object of the present invention is to provide an internally located spring loaded means for one of the aforementioned pairs of spaced-apart plugs to allow differential closing of these plugs against their respective seats.

More specifically, it is an object of the present invention to provide the aforementioned safety valve disclosed herein with an internally spring loaded means, so that a first one of these plugs forming an adjustable part of a gas supply inlet can be initially moved from an open position into closed contact with its associated seat, while a second one of these plugs forming an adjustable part of a gas burner supply valve is being moved toward its closed position, and the third plug forming a vent valve is being opened to a fully open position.

It is another object of the present invention to provide a valve of a single body construction having three plugs therein which, during its initial closing valve movement, is operable in prescribed sequence to move one of the plugs to a position that will shut off a supply of gas being transmitted through an inlet port of the valve to a central chamber of the valve while gas within the chamber and a burner gas supply pipe connected to the chamber is exhausted, by way of a vent valve, from the chamber to atmospheric pressure and during the final closing valve movement is operable to move another of these plugs to a position that will cut off the gas in the burner gas supply pipe from the central chamber of the valve while the gas in the chamber continues to be exhausted from a vent valve of an increasing size exhaust port in the chamber.

It is another object of the present invention to provide a single valve body means having three plugs therein which, during a movement of the valve to an open position, is operable in reverse sequence to the valve sequence previously referred to.

It is another object of the invention to employ an actuator to move the valve plugs of the aforementioned safety fuel shut-off valve between their fully open and fully closed positions and to employ a multiple solenoid valve unit operably connected to rapidly close a shut-off valve when it receives an electrical signal representing an unsafe burner condition from a flame safeguard unit by exhausting air from the positioner, and wherein the solenoid valve is further operably connected with the flame safeguard unit to apply air under increased pressure that is transmitted to the positioner to thereby allow the fuel shut-off valve to be rapidly moved to a fully open position during a safe burner condition.

It is another object of the present invention to provide an externally spring loaded means for the aforementioned pair of spaced-apart plugs to enable the plugs to be moved to a safe closed-off gas supply condition in the event of an air leak in the air supply line, a failure of any moving part of the actuator, or when failure occurs on the current being transmitted to the aforementioned air pressure regulating solenoids.

Another object of the present invention is to provide a unitary self-aligning, fluid tight, swivel bearing and pressure seal for use with the aforementioned valve actuator stem.

A better understanding of the present invention may be had from the following detailed description when read in connection with the accompanying drawings in which:

FIG. 2 is a cross-section of the valve taken along sectional line 2—2 of FIG. 1;

FIG. 3 is a cross-section of the valve taken along section line 3—3 of FIG. 2;

FIG. 4 is a cross-section of the valve taken along section line 4—4 of FIG. 2;

FIG. 5 is a view taken along line 5—5 of FIG. 1, showing in section the front and back cover plates for the valve actuator yoke shown in the last-mentioned figure;

FIG. 6 is an external front elevation view of the upper portion of FIG. 1 or a view taken along line 6—6 of FIG. 5;

FIG. 7 is a sectional view taken along the line 7—7 of FIG. 5;

FIG. 8 is a schematic view of the position that the plugs of the shut-off valve are in when they are moved to a fully opened, closed vent position and further shows how this valve is operably connected with a flame safeguard unit to safely control the fuel that is being fed through a main gas line to a burner;

Figure 1:
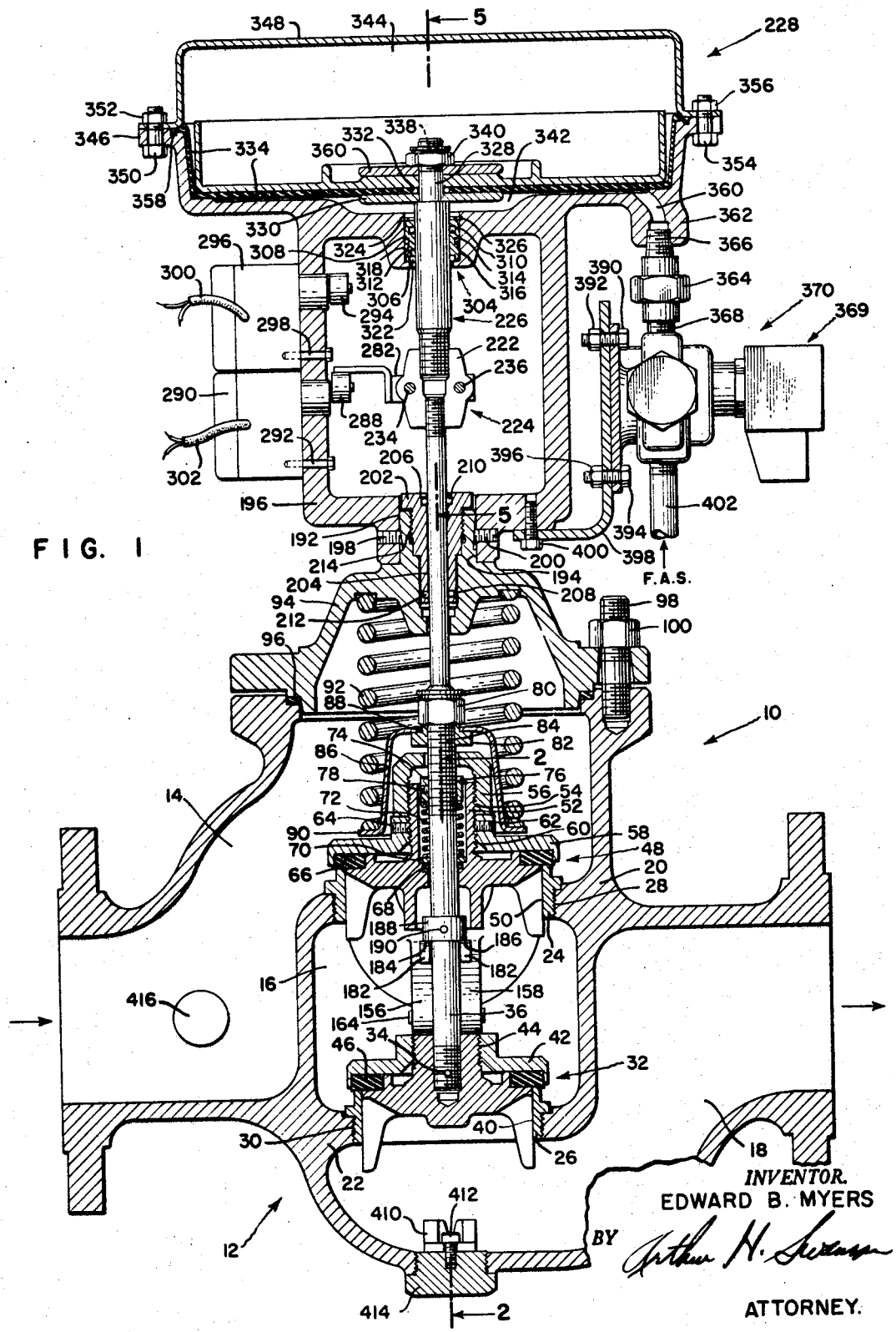
FIG. 1 shows a cross-sectional view of the improved safety shut-off valve and actuator.

FIG. 9 is a schematic view of one intermediate position that the plugs of the valve will be in as they are moved from the fully opened, closed vent position shown in FIG. 8 to the fully closed, open vent position shown in FIG. 10 and also represents the intermediate position that the plugs will be in when these plugs are being moved in a reverse direction between the position shown in FIG. 10 and the position shown for these plugs in FIG. 8, and FIG. 10 is a schematic view of the position that the plugs of the shut-off valve are in when they are moved to a fully closed, opened vent position and further shows how this valve is operably connected with a flame safeguard unit to safely control the fuel that is being fed through a main gas line to a burner.

The safety shut-off valve, 10, shown in FIGS. 1 and 2 of the drawing, is comprised of a body 12 that is of a unitary construction. The valve body 12 provides an inlet passageway 14, a central passageway 16, and an outlet passageway 18.

FIG. 1 also shows the central passageway 16 as having two cylindrically-shaped wall portions 20, 22. Two identical seat rings 24, 26 which form seats of this valve are shown threadedly mounted in a fixed position at 28, 30 in the wall portions 20, 22.

A first cylindrical plug 32 is shown fixedly connected by means of a pin connection 34 to a stem 36 of the valve 10. The plug 32 has a multiple slotted skirt portion 40 whose outer periphery slideably engages the inner cylindrical wall of the seat ring 26. This plug 32 also has a cylindrical flange 42 threadedly mounted thereto at 44 and a ring 46 made of a durable flexible seating material such as neoprene.

The valve plug 32 is shown in FIG. 1 of the drawing in a fully closed position in which the flexible ring 46 of the plug 32 is in sealing engagement with the entire upper peripheral surface of the seat ring 26.

A second cylindrical plug 48 is shown having a multiple slotted skirt portion 50 whose outer periphery slideably engages the inner cylindrical wall of the seat ring 24. The upper end of the plug 48 is provided with a sleeve 52 that is shown in sliding engagement at 54 with a hollow cylindrical hub-shaped sleeve 56.

The plug 48 has a cylindrical flange 58. This flange is shown adjustably positioned by a threaded connection at 60 on the lower portion of the sleeve 52 and fixedly secured thereto by a suitable number of set screws 62, 64. The valve plug 48 is shown provided with a ring 66 made of a durable flexible seating material such as neoprene. The valve plug 48, shown in FIG. 1, is in a fully closed position or a position in which the flexible ring 66 of the plug 48 is in sealing engagement with the entire top seat ring 24.

A neoprene ring 68 of O-shaped cross-section is shown in sealing engagement between the lower inner wall of the sleeve 52 and the outer peripheral surface of the cylindrical stem 36. An O-ring seal retaining washer 70 having an inner cylindrical wall spaced from the stem 36 and an outer cylindrical wall in contact with the inner surface of the sleeve 52 is shown having its lower flat surface in contact with the upper surface of the O-ring 68 and an entire lower wall of sleeve 62 of the plug 48.

A coil spring 72 positioned within the sleeve 52 and about the peripheral surface of the stem, as shown in FIG. 1, has its lower end in engagement with the washer 70. The other upper end of the coil springs 72 is adjustably fixed in a desired slightly compressed position about the outer surface of the stem by means of a collar 74 that is adjustable by means of a threaded connection at 76 along the stem 36. A suitable number of radially spaced apart set screws similar to the set screws 78 can be used to retain the collar 74 in the aforementioned adjustably fixed position.

A pair of jam nut members 80, 82 are shown threadedly adjusted at a desired fixed position along a threaded portion 84 of the stem 36. A cup-shaped member 86 is fixedly connected by a welded connection or by peening at 88.

The other end of the member 86 terminates in a cylindrically-shaped lip 90. The top surface of this cylindrically-shaped lip supports the lower end of a coil type compression spring 92, thereon. The other end of the coil spring 92 is retained in a fixed position by means of a bonnet 94.

A gasket 96 is shown positioned between a cylindrical lower surface of the bonnet 94 and an upper surface of the valve body 12. The bonnet 94 is retained in fixed fluid tight engagement with the top surface of valve body 12 by a suitable number of spaced-apart dual end threaded studs and tightly threaded nut connections of the type identified in the drawing as reference numeral 98, 100.

As is best illustrated in FIG. 2 of the drawing, the central passageway 16 of the single valve body 12 is intricately connected by way of an adjustable opening formed between a third valve plug 102 and a seat ring 104 to a fourth passageway 106, which latter passageway, in turn, is vented to atmospheric pressure.

The third valve plug 102 forming a vent is comprised of a multiple slotted member 108 having a plurality of radially-spaced-apart slots, for example 110, 112. The outer peripheral surface of the member 108 is in slidable contact with an inner cylindrical wall surface 114 of the seat ring 104. The inner bored out wall portion 116 of the member 108 is shown threadedly connected to a right end of the support rod 118.

The valve plug 102 is shown in FIG. 2 as having a ring 120 made of a durable flexible seating material such as neoprene which surrounds the rod 118. This ring 120 is held in fixed position by the left end of the member 108 and the right end of a plug actuating rod 122 from which the support rod 118 extends. The plug actuating rod 122 is shown extending through a coil spring 124 and a central aperture 126 formed in a cylindrical plate member 128.

As is best shown in FIG. 4, the cylindrical bushing 128 is provided with a series of arcuate-shaped passageways 130, 132, 134. An outer peripheral portion of this bushing 128 is fixedly supported by a threaded connection at 136 with a casing member 138. The right end of the bushing 128 has a recessed portion for retaining the left end of the coil spring 124. The other end of this spring 124 is shown in engagement with an embossed portion 140 of the plug actuating rod 122.

A gasket 142 is shown positioned between a left, outer end peripheral portion of the casing member 138 and an end portion 144 of the central passageway 16 of the valve body 12.

A suitable number of spaced-apart tap bolts, for example the tap bolts 146, 148, are used to threadedly mount the casing member 138, which has the atmospheric exhaust passageway 106 therein, in tight sealed leak-proof engagement with the valve body 12.

A collar 150 is threadedly connected, as shown in FIG. 2, to the left end of the plug actuating rod 122 and is retained in a selected position thereon by means of spaced-apart set screws 152, 154.

As is best shown in FIGS. 2 and 3 of the drawing, the left end of the casing member 138 has a pair of support brackets 156, 158 protruding therefrom. The left ends of each of the support brackets are provided with apertured wall portions 160, 162. A pin 164 is shown in FIG. 3 passing through each of these apertured wall portions 160, 162 and a reduced diametral portion 166 thereof is retained in fixed position by means of a set screw 168 on the pin 164.

A needle bearing 170 is shown mounted on the stationary pin 164 so that the hub portion 172 formed integral with the two arm portions 174, 176 of a bell crank lever 178 can be moved through an arc in a clockwise and counterclockwise direction thereon.

As is best shown in FIG. 3, the outer end portions 180, 182 of each of the arms 174, 176 are of a fork-shaped construction. The outer forked end of arm 176 straddles the stem 36 and is shown in FIG. 1 in contact at its upper curved ends 184, 186 with a collar 188 that is fixedly mounted in position on the stem 36 by means of a pin connection 190.

The outer forked end portion 180 straddles the plug actuating rod 122 and contacts collar 150 in the same manner as the previously referred to forked end portion 182 straddles its associated stem 36 and contacts its associated collar 188.

A sleeve-shaped part 192, which forms a top of the bonnet 94, is shown in FIG. 1 extending into an apertured wall portion 194 formed in a lower end of the yoke 96. Set screws 198, 200 are employed to retain the sleeve-shaped part 192 and the wall portion 194 of the yoke 196 in fixed position with respect to one another.

A guide 202 for a stem 36 is shown having a centrally located apertured wall 204 spaced from the stem 36 and an apertured ring-shaped wall portion 206, 208 into which associated seals 210, 212 of O-shaped cross-section have been inserted.

A threaded connection 214 is shown in FIG. 1 retaining the stem guide 202 in fixed threaded engagement with the sleeve-shaped part 192 of the bonnet 94.

The arrangement of the stem guide 202 is such that under normal reciprocal movement of the stem 36 the bottom O-ring 212 will be oprative to seal the gas pressure within the body 12 while the top O-ring 210 is used as a stem wiper. If for any reason the bottom O-ring 212 fails to act as a seal, and gas from the body leaks therethrough, then the top O-ring will act as a safeguard in sealing the pressure within the valve body 12.

The end of the stem 36 is shown threadedly engaged at 216, 218 with the respective lower half portions 220, 222 which forms the clamp 224.

The lower end of a stem 226 of an actuator 228 is also shown threadedly engaged at 230, 232 with the respective upper half portions 220, 222 of the clamps 224.

FIGS. 6 and 7 show a pair of tap bolts 234, 236 connecting the half portions 220, 222 of the clamp 224 so that the valve stem 36 and the actuator stem 226 are fixed for joint reciprocal movement with one another, as is shown in FIG. 5.

As is best seen in FIGS. 5 and 7, each of these tap bolts 234, 236 pass through the apertured wall portions 238, 240 of an indicator support bracket 242 which is of a substantially N-shaped construction so that joint reciprocal movement can take place between this bracket 244 and the clamp 224.

The bracket 242 also has two additional apertured wall portions 244, 246 formed therein for mounting on an indicator plate 248 by means of a pair of tap screws and nut connections 250, 252; 254, 256.

As is best shown in FIG. 6, the front surface of the indicator plate 248 is elongated along a vertical plane and contains the word "open" inscribed thereon in aluminum letters on a green background which can be seen through a transparent window 258 forming an otherwise central portion of an opaque cover plate 260 when the stem 36 has moved the plugs 32, 48 of the safety shutoff valve 10 to their open positions, as is shown in FIG. 1.

The indicator plate 248 also has inscribed thereon the word "shut" in aluminum letters on a red background which will appear in front of the transparent window 25 when the stem 36 has moved the plugs 32, 48 of the safety shut-off valve to their closed seated engaged position, such as is schematically illustrated in FIG. 10 of the drawing.

The outer peripheral portion of the cover plate 260 is connected to the yoke 196 by means of the screw connections 262-272. This yoke 196 also has the peripheral portion of a unitary entirely opaque second cover plate 274 similarly connected thereto by means of screw connections such as is shown at 276, 278, 280 in FIG. 5.

The right end of the split clamp 224 shown in FIG. 7 has a vent plate 282 fixedly retained thereon by means of screw connections 284, 286. When the stem parts 36, 226 are reciprocated from the aforementioned valve open to the aforementioned valve closed position the plate 282 will be moved into engagement with a switch actuating roller 288 which is of a commercially available miniature precision type switch 290. This switch 290 is mounted by means of a suitable number of screw connections to the yoke 196 in the manner shown by the screw connection 292.

When the stem parts 36, 226 are reciprocated from their closed to open position, the plate 282 will be moved into engagement with another switch actuating roller 294 which is a commercially available miniature precision type of switch 296. This switch 296 is also mounted by means of a suitable number of screw connections to the yoke 196 in the manner shown for the screw connection 298.

Each of the aforementioned roller actuated openedclosed valve position switches 296, 290 are, in turn, operably connected by means of suitable electrical connections 300, 302, to a valve position indicator, not shown, that is located at a distance from the safety valve 10 so that the position that this valve is in at any instant of time can be readily ascertained at that remote location.

The upper end portion of the stem 226 is provided with a unitary self-aligning, fluid tight, swivel bearing and pressure seal 304. This seal 304 has an inner cylindrical wall surface 306 and a tapered barrel-shaped outer bearing peripheral surface 308, as shown in FIG. 1. The inner and outer surfaces 306, 308 of the seal 304 have wall portions which form cylindrical grooves 310, 312. O-rings 314, 316 are employed to form fluid tight joints between the seal 304 and the stem 226 and between a cylindrically-shaped apertured wall 318 of the yoke 196 with which the respective cylindrical grooves 310 and 312 and the O-rings are associated.

The lower end of the seal 304 is provided with a cylindrical apertured wall portion therein for receiving a cylindrical ring of a commercially available flexible material 320 to wipe the stem 226 when the latter is actuated.

The yoke 196 is shown provided with a cylindricallyshaped lip 322 protruding therefrom for supporting the seal 304 thereon in fluid tight swivel relationship with the apertured yoke wall portion 318. An upper end portion of the yoke 196 is provided with a cylindrical apertured wall portion 324 that is spaced from the upper end of the seal 304 and into which the snap ring 326 is shown inserted.

It should be understood that in some applications it may be desired to make the taper of the outer peripheral surface 308 of the seal 304 of a greater or smaller dimension than the tapered angle shown for the tapered surface 308 in FIG. 1. Such changes will enable the seal and the stem 226 that is slidably associated with the seal to be moved through a greater or less swivel angle than will be possible in the seal construction shown in FIG. 1.

The upper end portion 328 of the stem 226 is surrounded by a cylindrical apertured wall portion of a pressure plate 330, and ring seal 332, a cylindrical apertured wall of a diaphragm 334 and a diaphragm retaining plate 336.

A threaded joint connection 338 is shown between a jam nut 340 and the stem portion 328. The nut 340 is shown in a tightened position so that a fluid tight joint is formed between the lower chambers 342 and an upper chamber 344 of the actuator 228.

The upper end of the yoke 196 has a cylindrical flanged portion 346 integral therewith. The upper surface of this flange is shown in contact with the lower surface of an inverted cup member 348. A suitable number of spaced-apart bolt and nut connections, such as the bolt and nut connections 350, 352; 354, 356 shown in FIG. 1, are employed to retain the outer peripheral surface 358 of the diaphragm 334 in fixed clamped engagement between the lowermost surface of the member 348 and the upper flanged portion 346 of the yoke 196.

FIG. 1 shows a passageway 360 passing through an upper embossed portion 362 of the yoke 196. One end of a pipe coupling connection 364 is shown threadedly engaged in fluid tight engagement at 366 with an outer end of the passageway 360. The other end of this pipe connection 364 is threadedly connected at 368 to the pilot portion 369 of a commercially available, explosionproof, dual, solenoid, pilot-controlled, four-way fluid pressure supply valve 370.

A pair of conductors 372, 374, are shown in FIG. 8 of the drawing operably connected to transmit an A.C. control signal from an electrical receiver which forms a part of a flame safeguard unit 378 and transmitter 376 to a solenoid actuated A.C. circuit 380 of the fluid supply valve 370 which, when energized, will open this valve or which, when de-energized, will cause the valve to thereafter remain open.

Another pair of conductors 382, 384 are shown in FIG. 8 operably connected to transmit a second electrical control D.C. signal from a second electrical receiver and transmitter 386 which forms a second part of a flame guard unit 378 to a solenoid actuated D.C. circuit 388. When the D.C. circuit 388 is energized, it is operably connected to close the fluid supply valve 370.

The pilot control portion 369 of the solenoid operated supply valve 370 is supported in a fixed position by means of a bolt and nut connection 390, 392; 394, 396 to a J-shaped bracket 398, as shown in FIG. 1.

The aforementioned J-shaped bracket 398 is, in turn, supported in a stationary position on the yoke 196 by means of a suitable number of tap bolts in the manner shown for the tap bolt 400 in FIG. 1 of the drawing.

The safety shut-off valve 10 is shown in the fully open position in FIG. 8 or in a position in which the plugs 32 and 48 have been moved to their maximum distance away from their seat, and wherein the plug 102 of the vent valve is in a closed fluid tight position against its associated seat.

FIG. 8 shows the position that the safety valve 10 will be in when:

(1) The flame safeguard unit 378, associated with the electric receiver and A.C. transmitter unit 376, is sending a signal to this unit 376 which indicates that a safe condition exists at the burner of a gas fired boiler for sending a fuel supply of gas thereto.

(2) The solenoid actuated A.C. circuit 380 has energized the four-way, dual, solenoid pilot valve 369 to an open position to allow a supply of air to pass from an air pressure supply source, not shown, through a supply conduit 402 connected thereto and thence through the four-way valve and conduit 364, passageway 360, into the lower chamber 342 of the actuator 223.

(3) The exhaust port 404 of the four-way valve 370 which connects the air pressure in the lower chamber 342 and this four-way valve to atmosphere will be closed.

(4) A fourth fluid pressure outlet port 406 is closed by means of a standard pipe plug 408.

FIGS. 8 and 9 show successive positions that the plugs 32, 48, 102 and diaphragm 334 of the safety valve 10 will be in when:

(1) Flame safeguard unit 378 associated with the electric receiver and A.C. and D.C. transmitter units 376, 386 is sending a signal to these units which indicates that an unsafe condition exists for continuing the transmission of the gas to the burner of the aforementioned gas fired boiler.

(2) The solenoid actuated D.C. circuit 388 has energized the four-way dual solenoid pilot valve 369 to a closed position and the solenoid actuated A.C. circuit 380 has been de-energized to close off air pressure being delivered from a fluid air pressure supply source and a supply conduit 402 to the pipe coupling connection 364 and to passageway 360 that opens into the lower chamber 342 of the actuator 328.

(3) The exhaust port 404 of the four-way valve 370 which connects the air pressure in the lower chambers 342 and this four-way valve to atmosphere will be open.

(4) The fourth fluid pressure outlet port 406 remains closed by means of the plug 408.

It can be seen from the aforementioned description of the safety valve 10 and the electrically controlled solenoid apparatus supply valve 370 that, under the safety valve open position shown in FIG. 8, the plugs 32, 48 will be raised by the pressure of the air applied from an air pressure source, not shown, by way of supply conduit 402, the four-way dual pilot valve 369 and the passageway 360 in an upward direction against the diaphragm forming one of the wall portions of the lower chambers of the actuator 342.

The air supply pressure acting on the diaphragm 334 shown in FIG. 8 will also allow the bell crank lever 178 to be rotated about its pivot to a position that will allow the spring 124 to move the plug into a position that will shut off the gas in the central chamber of the valve from being vented to atmospheric pressure. This FIG. 8 position of the valve plugs 32, 48, 102 will prevail only as long as the flame safeguard unit indicates by means of an electrical signal sent to the four-way dual pilot valve control unit 370 that it is safe for a full flow of gas to be transmitted to the gas burner.

It can further be seen from the aforementioned description of the safety valve 10 and the electrically controlled solenoid operated valve 370 that when an electrical signal is sent to the four-way pilot valve control unit 370 indicating that it is unsafe to send gas to the burner, then the air in the lower diaphragm chamber 342 of the actuator 228 is immediately exhausted by way of the passageways 360, conduit 364, pilot valve 368 through exhaust passageway 404 to atmospheric pressure. As this air exhaust action takes place, the plug 48 will be immediately sealed as shown in FIG. 9 to prevent any further gas from passing into the central passageway of the valve.

FIG. 9, therefore, represents the position the plug 48 will be in at a first instant of time immediately before all of the air under pressure acting on the diaphragm 334 in chamber 342 is lowered to the pressure of the atmosphere by exhausting same by way of the then partially opened space formed between the seat ring 104 and the plug 48.

Since the valve plug 32, shown in FIG. 9, is in an unseated position, it can readily be seen that the gas under pressure which was, under the FIG. 8 condition, being supplied to the gas burner will now, under the aforementioned FIG. 9 position, be allowed to be exhausted to atmospheric pressure by way of the openings formed between plugs 32, 102 and their associated seat rings 26, 104.

The diminishing pressure of the air in chamber 342 that is applied in an upward direction to the lower surface of the diaphragm 334 shown in FIG. 9 simultaneously causes a diminishing force to be applied through the actuator stem 226, the valve stem 36, the nut connections 80–84 and the inverted cup-shaped member 90 to the lower end of the compression spring 92. This force will prevent the spring 92 from applying a greater force by way of the members 90, 80–84 to the stem 36 as long as the air pressure in chamber 342 is greater than atmospheric pressure. It can thus be seen that the plug 32 will at a second instant of time be moved from the unseated position shown for this plug in FIG. 9 to its seated FIG. 10 position by the aforementioned described force of spring 92.

While the aforementioned increase in the force of the spring 92 is being applied, the bell crank lever 178 will be simultaneously moved to bring the vent valve plug 102 from the partially opened to atmosphere unseated position shown in FIG. 9 to the fully opened unseated position shown in FIG. 10. When the plugs 48, 32, 102 of valve 10 are in the position shown in FIG. 10, the only gas that will then be able to be exhausted to atmosphere by way of the then open vent valve 102, 104 will be any gas which may still be present in the central passageway 16.

FIG. 1 shows a magnet 410 mounted by means of a tap bolt connection 412 to a pipe plug 414 which, in turn, is threadedly mounted as shown in the wall of the valve body which forms an outlet passageway 18 therein. Another magnet 416 is mounted in a similar manner in the wall of the valve body 10 which forms the inlet passageway 14. These magnets are for the purpose of preventing any undesired foreign metallic parts in the flowing fuel stream from entering the central passageway 16 and becoming lodged on the valve seats 24, 26.

From the aforementioned description, it can be seen that a fail safe, inexpensive, self-aligning, single-body safety valve has been disclosed herein which has a unique diaphragm and spring-actuated valve stem construction for moving a gas supply inlet and burner supply valve in a differential manner while the plug of a vent valve is moved between closed and open vent positions.

What is claimed is:

1. A safety shut off valve for safely regulating the flow of fuel from a fuel supply source under pressure to a burner, comprising a valve body of a single construction forming an inlet passageway connected to the fuel supply source, an outlet passageway connected to the burner and a central passageway extending between the inlet and outlet passageways, the central passageway having two spaced apart interior wall portions, a first one of the interior wall portions forming a first seat at the inlet end of the central passageway and the other one of the interior wall portions forming a second seat at the outlet end of the central passageway, a first plug mounted within the body on a stem for movement toward and into engagement with the first seat, a second plug mounted on the stem for movement toward and into engagement with the other remaining second seat, a lost motion means connected with the body, the stem and first plug to enable the first plug to be brought into engagement with its seat before the second plug is brought into engagement with its associated seat, the central passageway between the first and second seats of the valve body having a wall portion forming a vent therethrough, the inner surface of the last wall portion forming a third valve seat, and a third valve plug operably connected for movement with the portion of the stem extending between the first and second plugs out of seating engagement with its third valve seat to vent the central passageway and the fuel remaining in the outlet connected to the burner after the first plug is seated on its inlet seat and before the second plug has been seated on its outlet seat.

2. A safety shut off valve for safely regulating the flow of fuel from a fuel supply source under pressure to a burner, comprising a valve body of a single construction forming an inlet passageway connected to the fuel supply source, an outlet passageway connected to the burner and a central passageway extending between the inlet and outlet passageways, the central passageway having spaced apart inlet and outlet interior wall portions each containing a seat and forming a part of their associated inlet and outlet passageways, a stem, a first plug mounted within the body on the stem for movement towards, into engagement and away from the seat forming the inlet wall portion, a second plug mounted on the stem for movement in the same direction as the first plug toward, into engagement and away from the seat forming the outlet wall portion, a lost motion means associated with the valve body, stem and first plug to enable the first plug to be brought into engagement with its inlet seat of the valve body before the second plug is brought into engagement with its outlet seat, a compression spring positioned between the valve body and stem to maintain the first plug in fuel tight engagement with its associated seat, a portion of a wall forming the central passageway having a third valve seat and a vent for the valve body and a third valve plug operably connected for movement with the stem towards and away from seating engagement with the third valve seat, a burner safeguard unit, a fluid actuated actuator operably connected to the stem and controlled by the burner safeguard unit to sequentially move the stem and second plug associated therewith in a direction away from its seat and against the bias of the compression spring, the third plug into closed vent engagement with its seat and the first plug away from engagement with its seat when a safe burner condition is sensed by said unit and to thereby provide a passageway through which fuel flows from the fuel source, the inlet, central and outlet passageways to the burner.

3. A safety shut off valve for safely regulating the flow of fuel from a fuel supply source under pressure to a burner, comprising a valve body of a single construction forming an inlet passageway connected to the fuel supply source, an outlet passageway connected to the burner and a central passageway extending between the inlet and outlet passageways, the central passageway having spaced apart inlet and outlet interior wall portions each containing a seat and forming a part of their associated inlet and outlet passageways, a stem, a first plug mounted within the body on the stem for movement towards, into engagement and away from the seat forming the inlet wall portion, a second plug mounted on the stem for movement in the same direction as the first plug toward, into engagement and away from the seat forming the outlet wall portion, a lost motion means associated with the valve body, stem and first plug to enable the first plug to be brought into engagement with its inlet seat of the valve body before the second plug is brought into engagement with its outlet seat, a compression spring positioned between the valve body and stem to maintain the first plug in fluid tight engagement with its associated seat, a wall forming the central passageway in the valve body having a third valve seat, a vent extending from the third seat through the wall of the central passageway of the valve body, a third valve plug operably connected for movement with the stem toward and away from seating engagement with the third valve seat, a burner safeguard unit, a fluid actuator operably connected to the stem and controlled by the burner safeguard unit to move the stem and first plug associated with the inlet into engagement with its seat and to thereafter move the second plug associated with the outlet seat in a direction toward the outlet seat and the third valve plug immediately toward its open vent position after the first plug is brought into its closed position whenever an unsafe burner condition is sensed by said unit to thereby exhaust the fuel in the central passageway and the fuel remaining in the outlet connected to the burner.

References Cited
UNITED STATES PATENTS

| | | | |
|---|---|---|---|
| 1,776,363 | 9/1930 | Manning | 137—627 XR |
| 1,831,457 | 11/1931 | Larsen | 137—630.19 XR |
| 2,314,266 | 3/1943 | Beam | 158—123 XR |
| 2,344,192 | 5/1944 | Wantz | 158—130 XR |
| 2,687,738 | 8/1954 | Thornbery | 158—129 XR |
| 2,959,219 | 11/1960 | Hajny | 158—130 |
| 2,966,172 | 12/1960 | Smith | 251—61 XR |
| 2,999,536 | 9/1961 | Schwalbach | 158—123 |
| 3,034,571 | 5/1962 | Matthews | 158—123 |

WILLIAM F. O'DEA, *Primary Examiner.*

R. GERARD, *Assistant Examiner.*